(12) United States Patent
Koerber et al.

(10) Patent No.: US 9,341,159 B2
(45) Date of Patent: May 17, 2016

(54) METHODS FOR CONTROLLING WIND TURBINE LOADING

(71) Applicant: General Electric Company, Schenectady, NY (US)

(72) Inventors: Arne Koerber, Berlin (DE); William Edwin Holley, Greer, SC (US); Leonardo Cesar Kammer, Niskayuna, NY (US); Charudatta Subhash Mehendale, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 489 days.

(21) Appl. No.: 13/857,205

(22) Filed: Apr. 5, 2013

(65) Prior Publication Data

US 2014/0301842 A1 Oct. 9, 2014

(51) Int. Cl.
*B64C 11/00* (2006.01)
*F03D 7/02* (2006.01)

(52) U.S. Cl.
CPC ......... *F03D 7/0224* (2013.01); *F05B 2270/331* (2013.01); *F05B 2270/336* (2013.01); *F05B 2270/402* (2013.01); *F05B 2270/404* (2013.01); *Y02E 10/723* (2013.01)

(58) Field of Classification Search
USPC .............. 416/1, 31, 36, 37, 41, 170 R, 26, 27
See application file for complete search history.

(56) References Cited

U.S. PATENT DOCUMENTS

| | | | |
|---|---|---|---|
| 4,703,189 A | 10/1987 | DiValentin et al. | |
| 5,155,375 A | 10/1992 | Holley | |
| 5,289,041 A | 2/1994 | Holley | |
| 7,059,822 B2 | 6/2006 | LeMieux et al. | |
| 7,351,033 B2 | 4/2008 | McNerney | |
| 7,420,289 B2 | 9/2008 | Wang et al. | |
| 7,772,713 B2 | 8/2010 | Huang et al. | |
| 7,821,148 B2 * | 10/2010 | Piasecki | F03D 1/0658 290/44 |
| 7,964,979 B2 | 6/2011 | Miranda et al. | |
| 8,057,174 B2 | 11/2011 | Scholte-Wassink | |
| 8,131,402 B2 | 3/2012 | Neumann | |
| 8,487,464 B2 | 7/2013 | Skaare et al. | |
| 8,523,520 B2 * | 9/2013 | Nagasaki | F03D 7/0224 416/1 |
| 8,529,206 B2 * | 9/2013 | Numajiri | F03D 7/0204 290/55 |

(Continued)

FOREIGN PATENT DOCUMENTS

DE 102009015679 A1 10/2010
EP 2110551 A1 10/2009

(Continued)

OTHER PUBLICATIONS

Leithead, W.E. and Connor, B. (2000) "Control of variable speed wind turbines: design task", International Journal of Control, 73:13, 1189-1212.

(Continued)

*Primary Examiner* — Binh Q Tran
(74) *Attorney, Agent, or Firm* — Dority & Manning, P.A.

(57) ABSTRACT

Methods are provided for controlling wind turbine loading. In one embodiment, a method includes the steps of determining a current thrust value for the wind turbine, calculating a thrust differential based on the current thrust value and a predetermined maximum thrust value, calculating a desired pitch offset value based on the thrust differential and a thrust sensitivity value, and adjusting a pitch of the wind turbine utilizing the pitch offset value.

17 Claims, 8 Drawing Sheets

(56) References Cited

U.S. PATENT DOCUMENTS

| | | | |
|---|---|---|---|
| 8,622,698 B2* | 1/2014 | Kristoffersen | F03D 7/0224 290/44 |
| 8,803,351 B2* | 8/2014 | Dalsgaard | F03D 7/0224 290/44 |
| 8,803,352 B1* | 8/2014 | Koerber | F03D 7/0224 290/44 |
| 9,018,784 B2* | 4/2015 | Laborda Rubio | F03D 7/0224 290/44 |
| 2007/0057517 A1 | 3/2007 | McNerney | |
| 2007/0075546 A1 | 4/2007 | Avagliano et al. | |
| 2010/0133827 A1 | 6/2010 | Huang et al. | |
| 2012/0027586 A1 | 2/2012 | Hoffmann et al. | |
| 2012/0292903 A1 | 11/2012 | Merkel | |

FOREIGN PATENT DOCUMENTS

| | | |
|---|---|---|
| EP | 2112376 A2 | 10/2009 |
| WO | 2010112109 A2 | 7/2010 |
| WO | 2011157272 A2 | 12/2011 |

OTHER PUBLICATIONS

Holley et al., "Optimal Quasistatic Control of Variable Speed Wind Turbines," European Wind Energy Conference and Exhibition (EWEC '89), pp. 341-344, Jul. 10-13, 1989.

Carrasco et al., "Chapter 29: Wind Turbine Applications", Power Electronics Handbook—Devices, Circuits and Applications, pp. 737-768, Jan. 1, 2007.

Henriksen et al., "Wind turbine control with constraint handling: a model predictive control approach", IET Control Theory and Applications, The Institution of Engineering and Technology, vol. No. 6, Issue No. 11, pp. 1722-1734, Jul. 19, 2012.

European Search Report and Written Opinion issued in connection with corresponding EP Application No. 14167496.0-1607 dated Jan. 8, 2015.

International Search Report and Written Opinion issued in connection with corresponding PCT Application No. PCT/US2014/031281 on Jul. 8, 2014.

* cited by examiner

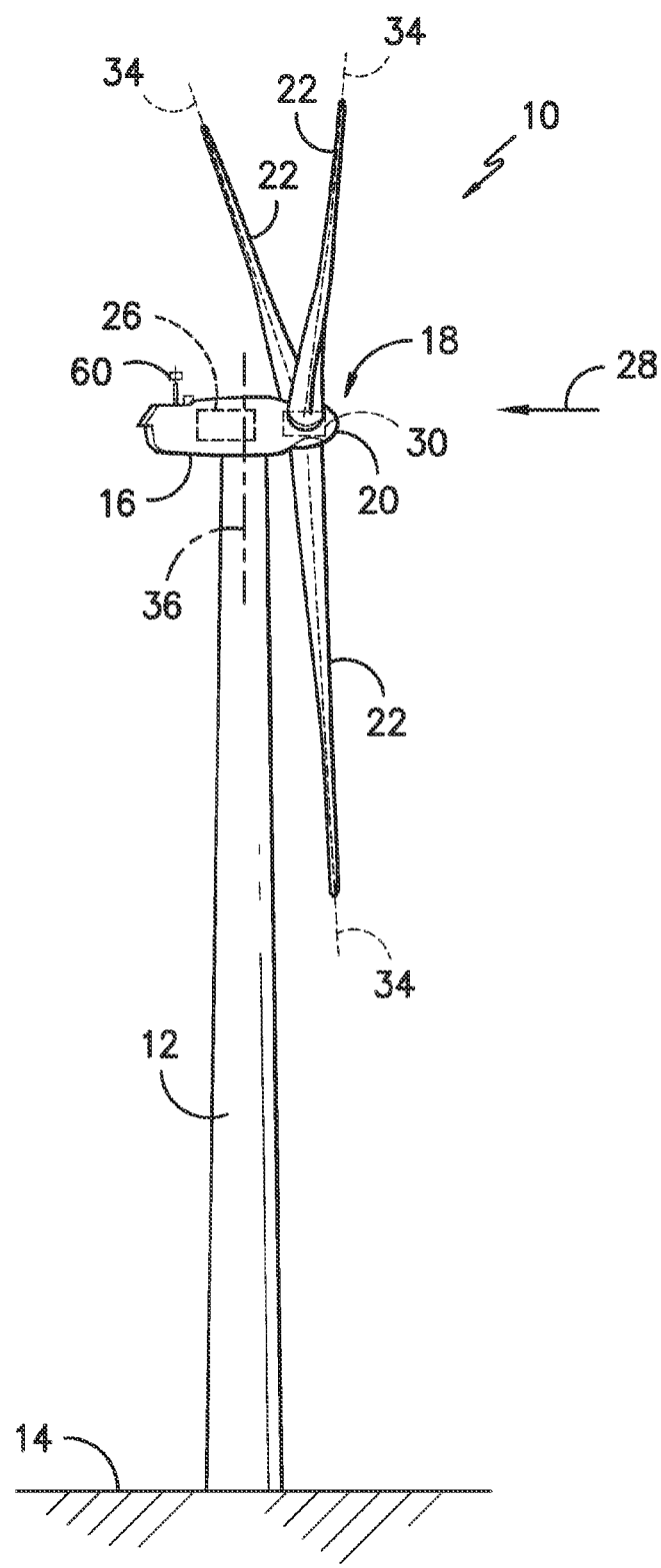
FIG. -1-

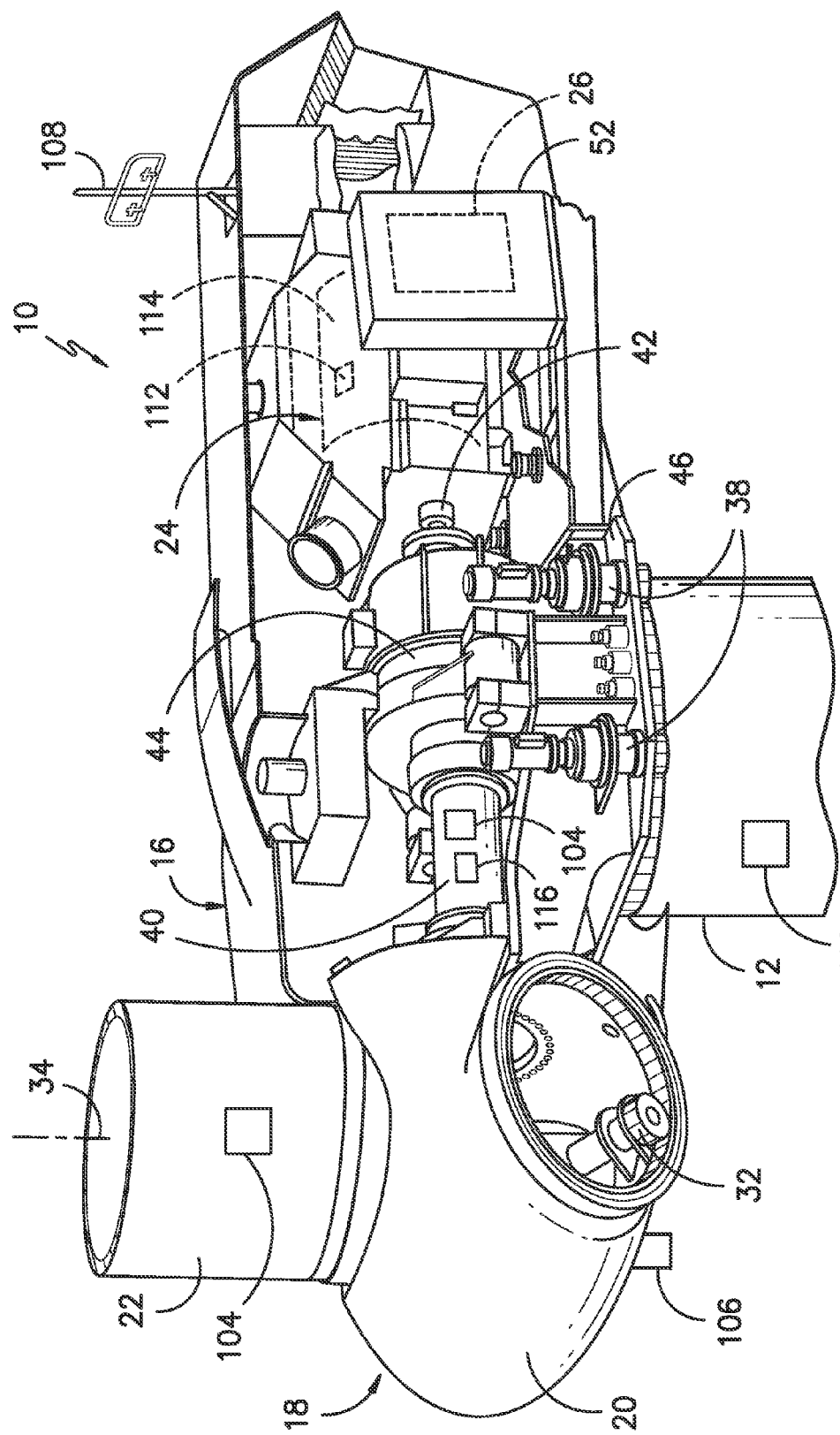
FIG. -2-

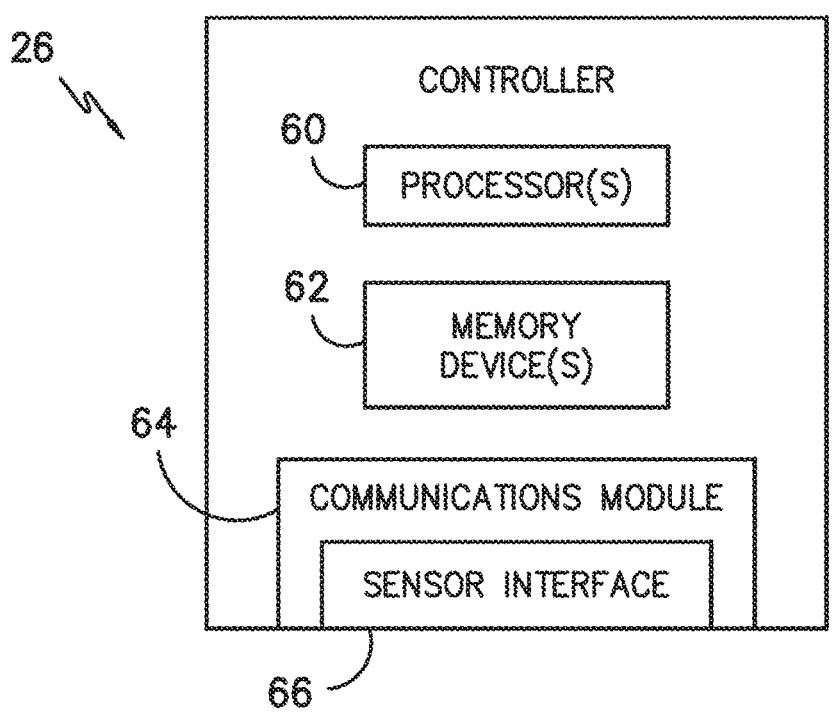
FIG. -3-

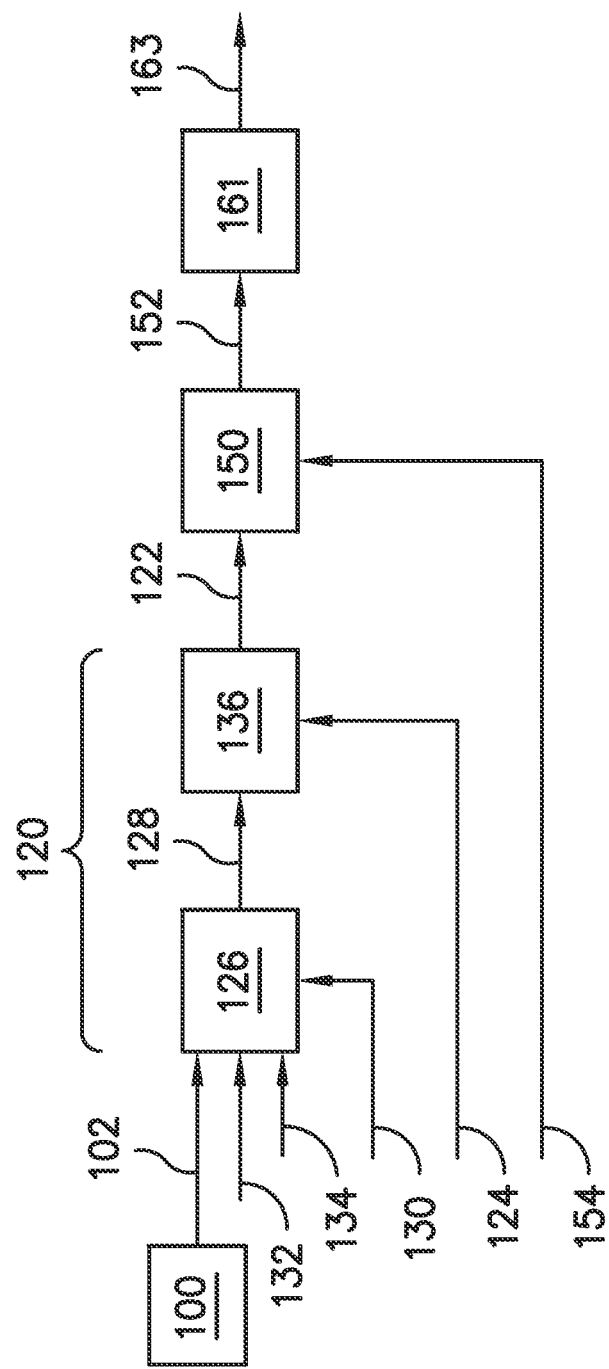
FIG. -4-

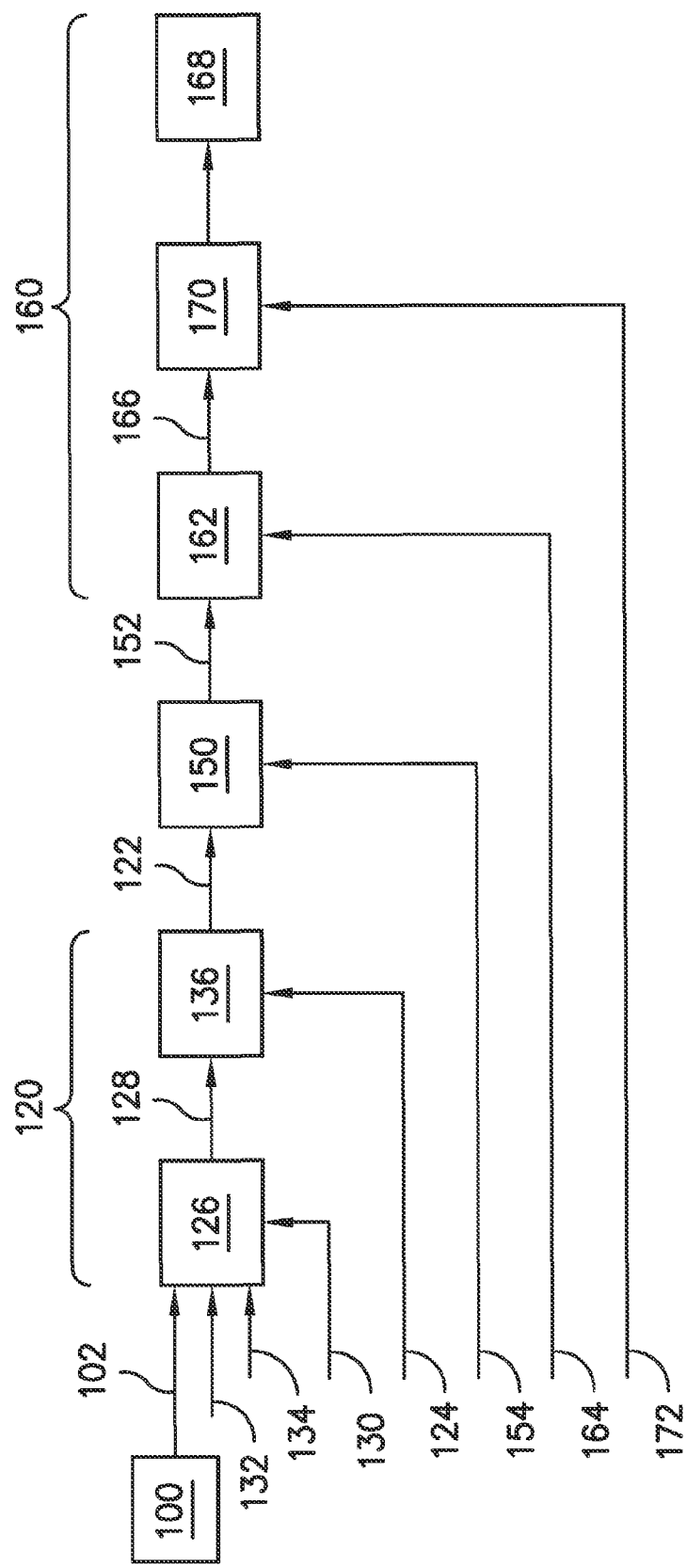
FIG. -5-

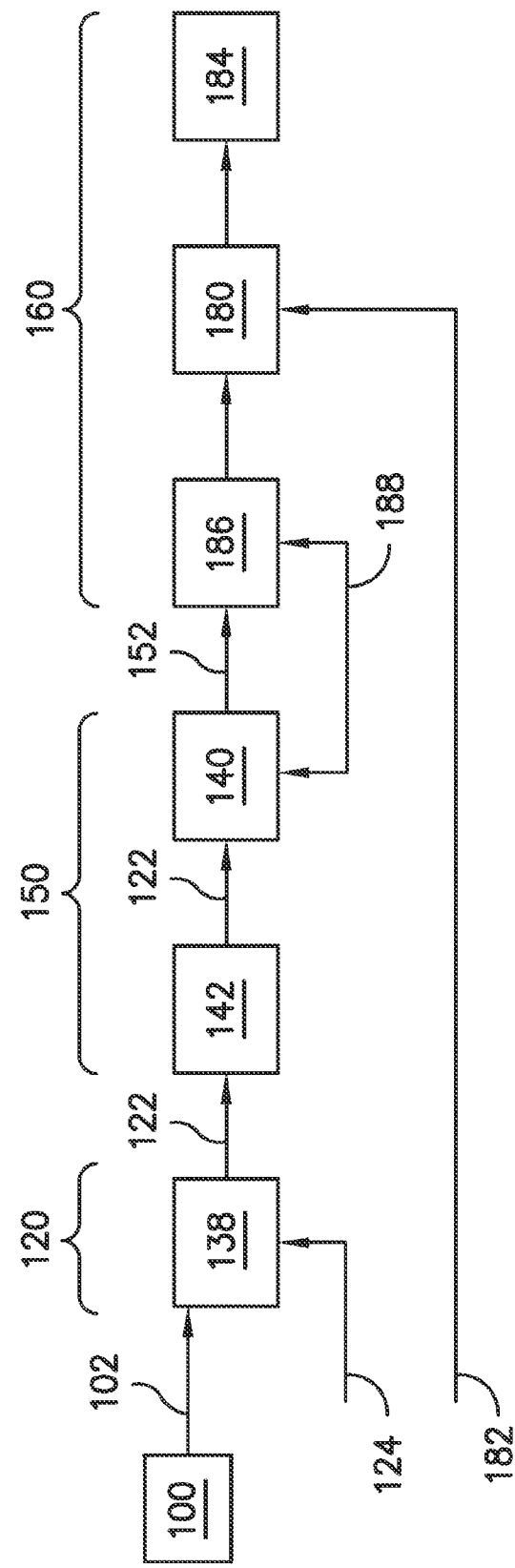
FIG. -6-

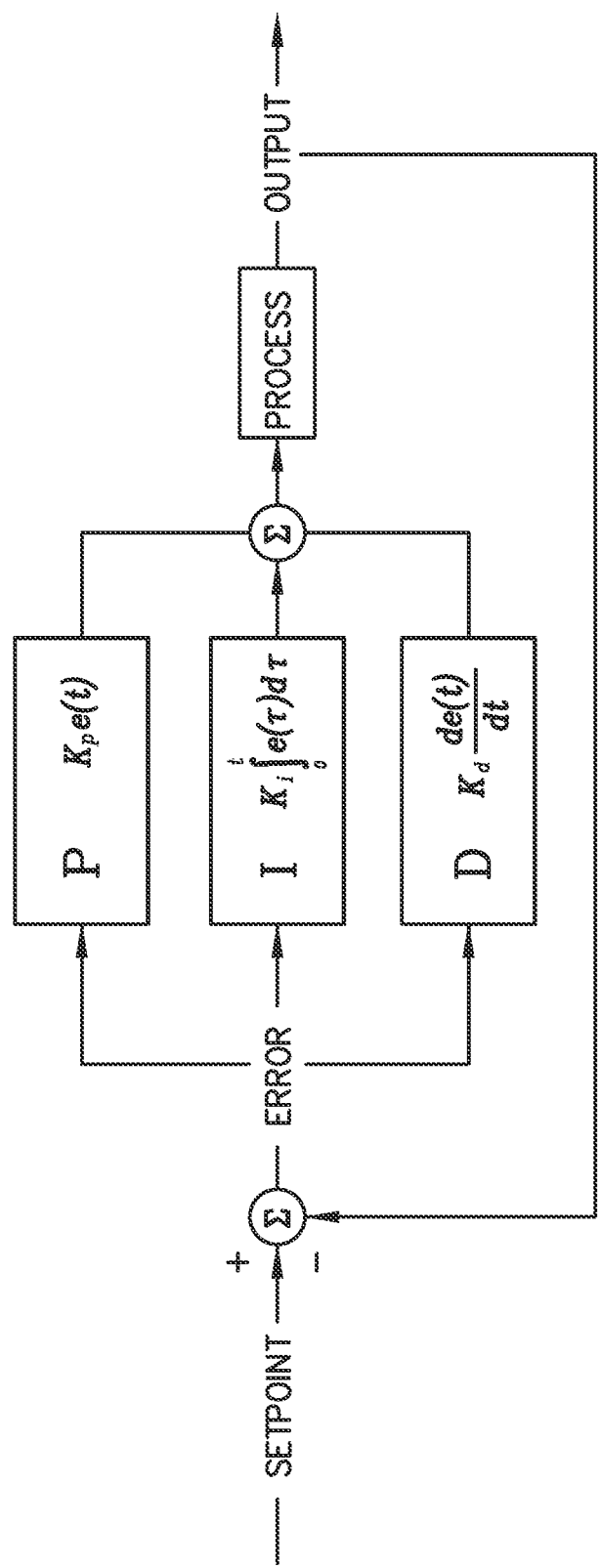
FIG. -7-

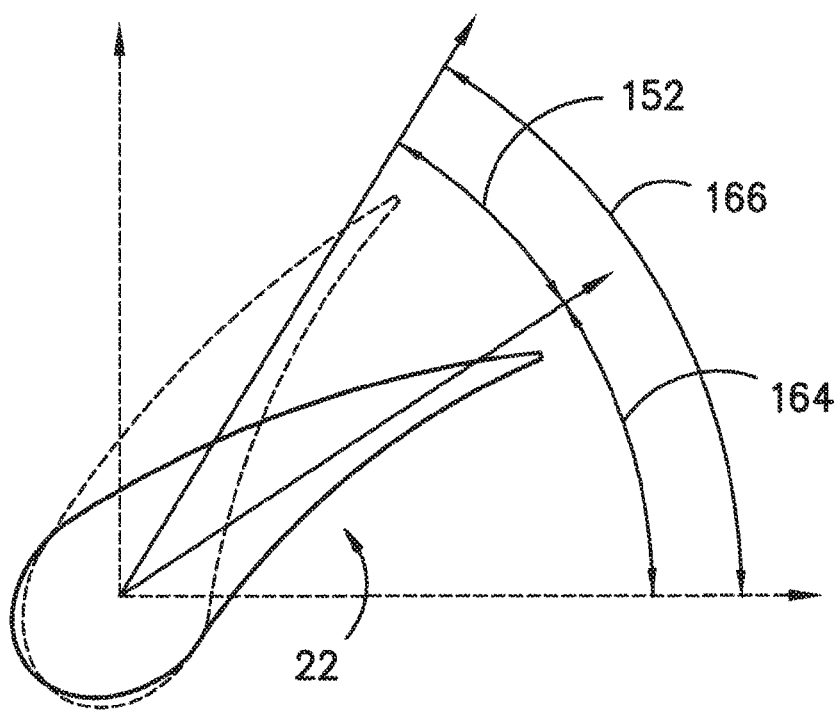
FIG. -8-

# METHODS FOR CONTROLLING WIND TURBINE LOADING

FIELD OF THE INVENTION

The present disclosure relates generally to wind turbines, and more particularly to methods for controlling wind turbine loading in wind turbines.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and a rotor including one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. In particular, the rotor blades experience significant loading, and frequent changes in loading, during operation due to interaction with the wind. Changes in wind speed and direction, for example, may modify the loads experienced by the rotor blades. To reduce rotor blade loading, various methods and apparatus have been developed to enable pitching of the rotor blades during operation. Pitching generally allows the rotor blades to shed a portion of the loads experienced thereby.

In particular, many wind turbines are designed for a rated wind speed at which maximum thrust and maximum power generation occur. At higher wind speeds than the rated wind speed, the thrust is lower due to pitching of the rotor blades. Many methods are known for determining whether to pitch the rotor blades in order to reduce thrust. However, with many such currently known methods for reducing thrust, there is significant lag time between changes in wind speed being experienced by the wind turbine and pitch commands being communicated to the rotor blades. Thus, excessive loading may be experienced by the wind turbine during the lag period. Such excessive loading can weaken and damage the rotor blades, and the wind turbine in general.

Accordingly, improved methods for controlling wind turbine loading are desired in the art. For example, methods that reduce or eliminate lag time would be advantageous. In particular, methods that utilize thrust values when determining rotor blade pitch commands would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a method for controlling wind turbine loading. The method includes the steps of determining a current thrust value for the wind turbine, calculating a thrust differential based on the current thrust value and a predetermined maximum thrust value, calculating a desired pitch offset value based on the thrust differential and a thrust sensitivity value, and adjusting a pitch of the wind turbine utilizing the pitch offset value.

In another embodiment, the present disclosure is directed to a method for controlling wind turbine loading. The method includes the steps of determining a current thrust value for the wind turbine, calculating an expected thrust value at a predetermined time based on the current thrust value, and comparing the expected thrust value to a predetermined maximum thrust value to determine a thrust differential. The method further includes the steps of calculating a desired pitch offset value based on the thrust differential and a thrust sensitivity value, adding the desired pitch offset value to a current pitch value to form a total pitch value for at least one rotor blade of the wind turbine, and instructing a pitch adjustment mechanism for the at least one rotor blade to adjust a pitch of the at least one rotor blade to the total pitch value for that rotor blade.

In another embodiment, the present disclosure is directed to a method for controlling wind turbine loading. The method includes the steps of determining a current thrust value for the wind turbine, inputting the current thrust value and a predetermined maximum thrust value into a proportional integral derivative control algorithm to determine a thrust differential, and calculating a desired pitch offset value based on the thrust differential and a thrust sensitivity value. The method further includes the steps of applying a pitch rate change limit to the desired pitch offset value, and instructing a pitch adjustment mechanism for at least one rotor blade of the wind turbine to adjust a pitch of the at least one rotor blade to by the desired pitch offset value for that rotor blade at no faster than the pitch rate change limit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of a wind turbine according to one embodiment of the present disclosure;

FIG. 2 illustrates a perspective, internal view of a nacelle of a wind turbine according to one embodiment of the present disclosure;

FIG. 3 illustrates a schematic diagram of one embodiment of suitable components that may be included within a controller of a wind turbine;

FIG. 4 is a block diagram illustrating a method for controlling wind turbine loading according to one embodiment of the present disclosure;

FIG. 5 is a block diagram illustrating a method for controlling wind turbine loading according to another embodiment of the present disclosure;

FIG. 6 is a block diagram illustrating a method for controlling wind turbine loading according to another embodiment of the present disclosure;

FIG. 7 is a block diagram illustrating a proportional integral derivative control algorithm according to one embodiment of the present disclosure; and FIG. 8 is a cross-sectional view of a rotor blade according to one embodiment of the present disclosure at various pitch angles.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

It should be appreciated that the turbine controller 26 may generally comprise a computer or any other suitable processing unit. Thus, in several embodiments, the turbine controller 26 may include one or more processor(s) and associated memory device(s) configured to perform a variety of computer-implemented functions, as shown in FIG. 3 and discussed below. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 26 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 26 to perform various computer-implemented functions including, but not limited to, performing proportional integral derivative ("PID") control algorithms, including various calculations within one or more PID control loops, and various other suitable computer-implemented functions. In addition, the turbine controller 26 may also include various input/output channels for receiving inputs from sensors and/or other measurement devices and for sending control signals to various components of the wind turbine 10.

It should additionally be understood that the controller may be a singular controller or include various components, such as pitch controllers and/or yaw controllers, which communicate with a central controller for specifically controlling pitch and yaw as discussed. Additionally, the term "controller" may also encompass a combination of computers, processing units and/or related components in communication with one another.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks 48, 50 mounted to the bedplate 46.

Additionally, as indicated above, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described above, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

The present disclosure is further directed to methods for controlling wind turbine 10 loading. In particular, controller 26 may be utilized to perform such methods, and may control pitch adjustment of the rotor blades 22 based on such methods in order to control loading on the rotor blades 22 and the wind turbine 10 in general. Methods utilized according to the present disclosure advantageously utilize various thrust values to determine appropriate pitch responses in order to prevent excessive loading. By utilizing such thrust values, lag time is significantly reduced, thus reducing potential damage to wind turbines 10 due to excessive wind speeds and gusts, and the resulting excessing thrust loading and blade fatigue that may result therefrom.

Referring now to FIG. 3, there is illustrated a block diagram of one embodiment of suitable components that may be included within the turbine controller 26 in accordance with aspects of the present subject matter. As shown, the controller 26 may include one or more processor(s) 60 and associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensor, to be converted into signals that can be understood and processed by the processors 60.

FIGS. 4 through 6 illustrate various embodiments of the methods for controlling wind turbine 10 loading according to the present disclosure. It should be understood that methods according to the present disclosure are in exemplary embodiment closed loop feedback methods, and may be utilized for with the rotor blades 22 of the wind turbine 10 individually or collectively. For example, desired pitch values, current pitch values, and total pitch values may be input and determined individually for each rotor blade 22 or collectively for the plurality of rotor blades 22. Methods according to these embodiments may include, for example, the step 100 of determining a current thrust value 102 for the wind turbine 10. The current thrust value 102 is generally the thrust that the wind turbine 10 is currently experiencing. Various methods and apparatus may be utilized for determining a current thrust value 102.

For example, in some embodiments, the current thrust value 102 may be measured. For example, sensors 104, such as strain gauges or fiber optic sensors, may be placed on the wind turbine 10, such as on the rotor blades 22 or shaft 40, to directly or indirectly measure the thrust to which the rotor blades 22 are subjected. Alternatively, measuring devices 106, such as pendulums or accelerometers, may be utilized to measure a tilt angle of the wind turbine 10. The tilt angle may be correlated to the thrust to which the rotor blades 22 are subjected. In other alternative embodiments, the wind speed upwind of the wind turbine 10 may be measured, such as through use of suitable weather sensor 108. Suitable weather sensors 60 include, for example, Light Detection and Ranging ("LIDAR") devices, Sonic Detection and Ranging ("SODAR") devices, anemometers, wind vanes, barometers, and radar devices (such as Doppler radar devices). The upwind wind speed may be correlated to the thrust to which the rotor blades 22 are subjected. In still other alternative embodiments, sensors 110 may be utilized to measure the deflection of the rotor blades 22. This deflection may be correlated to the thrust to which the rotor blades 22 are subjected. Still further, any suitable measurement methods and apparatus may be utilized to directly or indirectly measure the current thrust value 102.

In other embodiments, the current thrust value 102 may be estimated. For example, in some embodiments, the wind speed, and changes therein, can be estimated through use of, for example, a wind observer algorithm, which may be included in the controller 26. The wind observer system may input load torque applied to the generator 24, measured by suitable sensors such as sensors 112 on the generator rotor 114 or input shaft, and driving torque applied by the wind, measured by suitable sensors such as sensors 116, and may estimate the wind speed based on these inputs. The estimated wind speed can then be utilized to calculate a corresponding estimated thrust. Alternatively, any suitable methods or apparatus may be utilized to estimate the current thrust value 102.

Methods according to embodiments as shown in FIGS. 4 through 6 may further include, for example, the step 120 calculating a thrust differential 122. This calculation may be based on the current thrust value 102 and a predetermined maximum thrust value 124. The predetermined maximum thrust value 124 may be a thrust level which it is desirable that the wind turbine 10 not exceed, such as a thrust level to which the wind turbine 10 would be subjected at a predetermined wind speed at or below a rated wind speed for the wind turbine 10, and may be programmed into the controller 26.

FIGS. 4 and 5 illustrates one embodiment by which the thrust differential 122 is calculated 120. In these embodiments, such calculation includes the step 126 of calculating an expected thrust value 128 at a predetermined time 130 based on the current thrust value 102. The predetermined time 130 may be a time period in the future, for example 1 second in the future, 1.5 seconds in the future, 2 seconds in the future, 5 seconds in the future, etc., and may be programmed into the controller 26. Such calculation of expected thrust value 128 at this predetermined time 130 may be performed using any suitable modeling software and/or algorithms, and may utilize any suitable necessary inputs. For example, in some embodiments, such calculation 126 may be additionally based on a wind speed change rate 132 and a generator rotor speed change rate 134. These rates 132, 134, may be obtained by suitable sensors, such as accelerometers, mounted to the wind turbine 10, such as those sensors discussed above. Thus, in these embodiments, expected thrust value 128 may be calculated at a predetermined time 130 based on current thrust value 102, wind speed change rate 132, and generator rotor speed change rate 134.

In such embodiments as shown in FIGS. 4 and 5 by which the thrust differential 122 is calculated 120, such calculation may further include the step 136 of comparing the expected thrust value 128 to the predetermined maximum thrust value 124 to determine the thrust differential 120. Thus, this calculation may be accomplished by determining the difference between the predetermined maximum thrust value 124 and the expected thrust value 128.

FIG. 6 illustrates another embodiment by which the thrust differential 122 is calculated 120. In these embodiments, such calculation includes the step 138 of comparing the current thrust value 102 to the predetermined maximum thrust value 124 to determine the thrust differential 120. Thus, this calculation may be accomplished by determining the difference between the predetermined maximum thrust value 124 and the current thrust value 102.

Methods according to embodiments as shown in FIGS. 4 through 6 may further include, for example, the step 150 of calculating a desired pitch value 152 based on the thrust differential 122. The desired pitch value 152 is a desired angle to which one or more rotor blades 22 may be pitched. In some embodiments, the desired pitch value 152 may be a total pitch value, such as a minimum pitch value, for the rotor blade(s). The minimum pitch value may be a minimum overall value by which one or more rotor blades 22 is pitched during operation to reduce excessive loading, and may be adjustable during operation of the wind turbine. In other embodiments, the desired pitch value 152 may be a desired pitch offset value, and may be a desired angle by which one or more rotor blades 22 may be pitched from the current pitch angle for those rotor blade(s) 22. Such desired angle may for example reduce the current thrust value 102 or expected thrust value 128 to approximately equal to or less than the predetermined maximum thrust value 124. In some embodiments, as shown in FIGS. 4 and 5, the desired pitch value 152 may be based on the thrust differential 122 and a thrust sensitivity value 154. The thrust sensitivity value 154 may generally be the sensitivity of thrust, such as the current thrust value 102, to changes in the pitch angles of the rotor blades 22. The sensitivity value 154 may be a predetermined value 154, or may be determined during operation of the wind turbine 10 through use of various sensors such as those discussed above. The sensitivity value 154 may be expressed in units of thrust divided by angular units, such as degrees. To calculate the pitch value 152, the thrust differential 122 may for example be divided by the thrust sensitivity value 154.

FIG. 6 illustrates another embodiment by which the desired pitch value 152 may be calculated. In these embodiments, such calculation includes the step 140 of inputting the thrust differential 122 into a proportional integral derivative ("PID") control algorithm. As is generally understood, a PID control algorithm includes a generic control loop feedback mechanism that is widely used in processing applications to calculate an "error" as the difference between a measured process value (PV) (e.g., current thrust value) and a desired setpoint value (SP) (e.g., predetermined maximum thrust value). Thus, utilizing a PID control loop, the controller 26 may be configured to minimize the error by adjusting the process control inputs.

For example, FIG. 7 is a block diagram of a PID control algorithm, which is one embodiment of a control loop feedback control algorithm which is well known and need not be explained in detail herein. Generally, the PID control algorithm involves three separate parameters: the proportional (P), the integral (I), and the derivative (D) values. These values are combined to provide a controlled variable (CV) output from the PID control loop as a function of time. In the time realm, the proportional (P) value (also called "gain") makes a change to the CV output that is proportional to the current error value (e(t)) between the setpoint (SP) and process (PV) values multiplied by a tunable proportional gain factor $K_p$. The integral (I) value (also called "reset") makes a change to the CV output that is proportional to the magnitude and duration of the error by integrating the error over time and multiplying the value by a tunable integral gain factor The integral (I) term accelerates process towards the setpoint and eliminates the inherent steady-state error that occurs with proportional-only controllers. The derivative (D) value (also called "rate") makes a change to the CV output as a function of the slope of the error over time multiplied by a tunable derivative gain factor $K_d$. The derivative (D) term slows the rate of change of the controller output and reduces the magnitude of the overshoot produced by the integral (I) term. The proportional (P), integral (I), and derivative (D) terms are summed to calculate the CV output (u(t)) of the PID controller. The control algorithm is "tuned" to the specific requirements of the process by adjustment of the different gain factors (Kp, Ki, Kd) to achieve an optimum control response.

An input of the PID algorithm may thus be the "error", or thrust differential 122, and an output may be the desired pitch value 152. In some further exemplary embodiments, calculating the desired pitch value 152 may further include the step 142 of inputting the thrust differential 122 into a pre-filtering algorithm. Such pre-filtering may, in some embodiments, occur prior to inputting these values into the PID control algorithm. Pre-filtering may include, for example, low pass filtering, which may prevent high frequency actuation, or notch filtering at resonance frequencies or other known disturbance levels.

It should be understood that the present embodiment is not limited to PID control algorithms. For example, in alternative embodiments, proportional integral ("PI") control algorithms, proportional ("P") control algorithms, or any other suitable control loop feedback control algorithms may be utilized, through inputting of the thrust differential 122, to calculate the desired pitch value 152.

Methods according to embodiments as shown in FIGS. 4 through 6 may further include, for example, the step 160 of adjusting a pitch of the wind turbine 10, such as the pitch angle of one or more rotor blades 22 of the wind turbine 10, utilizing the pitch value 152. As shown in FIG. 4, for example, in some embodiments the pitch value 152 is a total pitch value. In these embodiments, the step 160 of adjusting the pitch may include the step 161 of adjusting a minimum pitch value 163, discussed above, to the pitch value 152. In other embodiments, as shown in FIGS. 5 and 6, the pitch value 152 may be a pitch offset value. For example, in some embodiments as shown in FIG. 5, the adjusting step 160 may include the step 162 of adding the desired pitch offset value 152 to a current pitch value 164 to form a total pitch value 166 for at least one rotor blade 22 of the wind turbine 10. FIG. 8 is a front view of a rotor blade 22 illustrating the various pitch values discussed herein. The adjusting step 160 may further include the step 168 instructing the pitch adjustment mechanism 32 for the at least one rotor blade 22 to adjust the pitch of the at least one rotor blade 22 to the total pitch value 164 for that rotor blade 22.

In some embodiments, as shown in FIGS. 4 and 5, the adjusting step may further include the step 170 of, if the desired pitch offset value 152 is less than or equal to zero, decaying adjustment of the pitch of the at least one rotor blade 22 to the current pitch value 164 within a predetermined time constant 172. The predetermined time constant 172 may be a time period, for example 1 second, 1.5 seconds, 2 seconds, 5 seconds, etc., and may be programmed into the controller 26. Because methods according to the present disclosure are operated as closed feedback loops, the desired pitch offset value 152 may be increased, such as for a short period of time during, for example, a wind gust or for a long period of time during, for example, a period of increased wind speeds. Once the gust ceases or the period of increased wind speed subsides, the desired pitch offset value 152 may be reduced, such that no further pitch adjustment is necessary, but the pitch adjustment mechanisms 32 may still be pitching the rotor blades 22. Decaying pitch adjustment to the current pitch value 164 within the predetermined time constant 172 may allow pitch adjustment to quickly cease, such that no unnecessary pitching is performed.

In some embodiments as shown in FIG. 6, for example, the adjusting step 160 may include the step 180 of applying a pitch rate change limit 182 to the desired pitch offset value 152. The pitch rate change limit 182 may be a predetermined maximum rate at which a pitch adjustment mechanism 32 may be allowed to pitch a rotor blade 22, such as for example, 2 degrees per second, 3 degrees per second, 4 degrees per second, etc., and may be programmed into the controller 26. In some embodiments, the adjusting step 160 may further include the step 184 of instructing a pitch adjustment mechanism 32 for at least one rotor blade 22 of the wind turbine 10 to adjust a pitch of the at least one rotor blade 22 to by the pitch offset value 152 for that rotor blade 22 at no faster than the pitch rate change limit 182.

In some embodiments, as further shown in FIGS. 4 and 5, the adjusting step 160 may further include the step 186 of, in embodiments wherein a control loop feedback control algorithm is utilized, if the pitch offset value 152 is less than zero, adjusting a feedback input 188 for the control loop feedback control algorithm. For example, in some embodiments, due to use of the PID control algorithm or another suitable control algorithm as discussed above, the resulting pitch offset value 152 may be less than zero, indicating that no further pitching is necessary. The feedback input 188 may the closed loop feedback into the control algorithm from the pitch offset value 152 results. If the feedback input 188 to the control algorithm is less than zero, the control algorithm may be corrupted, and output inaccurate results. Thus, the feedback input 188 may be adjusted in these instances to zero or another suitable input value to maintain proper functioning of the control loop feedback control algorithm.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling wind turbine loading, the method comprising:
   determining a current thrust value for the wind turbine;
   calculating, using an electronic controller, an expected thrust value at a predetermined future time based on the current thrust value;
   calculating, using an electronic controller, a thrust differential based on the expected thrust value and a predetermined maximum thrust value;
   calculating using an electric controller, a desired pitch value based on the thrust differential; and
   adjusting, using an electronic controller, a pitch of the wind turbine utilizing the desired pitch value.

2. The method of claim 1, wherein calculating the expected thrust value at the predetermined time is further based on a wind speed change rate and a generator rotor speed change rate.

3. The method of claim 1, wherein calculating the desired pitch value is based on the thrust differential and a thrust sensitivity value.

4. The method of claim 1, wherein adjusting the pitch comprises adjusting a minimum pitch value.

5. The method of claim 1, wherein the desired pitch value is a desired pitch offset value, and wherein adjusting the pitch comprises:
   adding the desired pitch offset value to a current pitch value to form a total pitch value for at least one rotor blade of the wind turbine; and
   instructing a pitch adjustment mechanism for the at least one rotor blade to adjust a pitch of the at least one rotor blade to the total pitch value for that rotor blade.

6. The method of claim 5, wherein adjusting the pitch further comprises decaying adjustment of the pitch of the at least one rotor blade to the current pitch value within a predetermined time constant if the desired pitch value is less than or equal to zero.

7. The method of claim 1, wherein calculating the desired pitch value comprises inputting the thrust differential into a proportional integral derivative control algorithm.

8. The method of claim 7, wherein calculating the thrust differential further comprises inputting the thrust differential into a pre-filtering algorithm.

9. The method of claim , wherein the desired pitch value is a desired pitch offset value, and wherein adjusting the pitch comprises adjusting a feedback input for the proportional integral derivative control algorithm if the desired pitch offset value is less than zero.

10. The method of claim 1, wherein the desired pitch value is a desired pitch offset value, and wherein adjusting the pitch comprises:
    applying a pitch rate change limit to the desired pitch offset value; and
    instructing a pitch adjustment mechanism for at least one rotor blade of the wind turbine to adjust a pitch of the at least one rotor blade to by the desired pitch offset value for that rotor blade at no faster than the pitch rate change limit.

11. The method of claim 1, wherein the current thrust value is measured.

12. The method of claim 1, wherein the current thrust value is estimated.

13. A method for controlling wind turbine loading, the method comprising:
    determining a current thrust value for the wind turbine;
    calculating, using an electronic controller an expected thrust value at a predetermined future time based on the current thrust value;
    comparing, using an electronic controller, the expected thrust value to a predetermined maximum thrust value to determine a thrust differential;
    calculating, using an electronic controller, a desired pitch value based on the thrust differential; and
    adjusting using an electronic controller, a minimum pitch value based on the desired pitch value.

14. The method of claim 13, wherein calculating the expected thrust value at the predetermined time is further based on a wind speed change rate and a generator rotor speed change rate.

15. A method for controlling wind turbine loading, the method comprising:
    determining a current thrust value for the wind turbine;
    comparing using an electronic controller, the current thrust value to a predetermined maximum thrust value to determine a thrust differential;
    calculating using an electronic controller, a desired pitch offset value by inputting the thrust differential into a control loop feedback control algorithm;
    applying, using, electronic controller, a pitch rate change limit to the desired pitch offset value; and
    instructing, using an electronic controller, a pitch adjustment mechanism for at least one rotor blade of the wind turbine to adjust a pitch of the at least one rotor blade to by the desired pitch offset value for that rotor blade at no faster than the pitch rate change limit.

16. The method of claim 15, wherein calculating the thrust differential further comprises inputting the current thrust value and the predetermined maximum thrust value into a pre-filtering algorithm.

17. The method of claim 15, wherein adjusting the pitch further comprises adjusting a feedback input for the control loop feedback control algorithm if the desired pitch offset value is less than zero.

\* \* \* \* \*